United States Patent
Vickio, Jr.

(10) Patent No.: US 9,582,007 B2
(45) Date of Patent: Feb. 28, 2017

(54) PRESSURE REGULATOR

(71) Applicant: Louis P. Vickio, Jr., Houston, TX (US)

(72) Inventor: Louis P. Vickio, Jr., Houston, TX (US)

( * ) Notice: Subject to any disclaimer, the term of this patent is extended or adjusted under 35 U.S.C. 154(b) by 149 days.

(21) Appl. No.: 14/465,507

(22) Filed: Aug. 21, 2014

(65) Prior Publication Data

US 2016/0054743 A1 Feb. 25, 2016

(51) Int. Cl.
*G05D 16/10* (2006.01)

(52) U.S. Cl.
CPC ................................ *G05D 16/10* (2013.01)

(58) Field of Classification Search
CPC ................................................. F15B 2211/86
USPC .............. 137/102, 110, 505, 505.11, 625.25, 137/625.26, 625.27, 625.67, 625.68
See application file for complete search history.

(56) References Cited

U.S. PATENT DOCUMENTS

| | | | |
|---|---|---|---|
| 2,984,251 A | 5/1961 | Quinby | |
| 3,007,492 A * | 11/1961 | Grimmer | F16K 31/36 137/102 |
| 3,227,172 A | 1/1966 | Bathory | |
| 3,239,012 A | 3/1966 | Bunting | |
| 3,532,296 A | 10/1970 | Carton | |
| 3,977,424 A | 8/1976 | Patton | |
| 4,040,437 A * | 8/1977 | Gottling | B30B 15/28 137/102 |
| 4,091,832 A | 5/1978 | Snyder | |
| 4,267,892 A | 5/1981 | Mayer | |
| 4,506,693 A | 3/1985 | Acker | |
| 4,510,962 A | 4/1985 | Mott | |
| 4,747,425 A | 5/1988 | Lauer | |
| 5,462,076 A | 10/1995 | Voss | |
| 6,481,454 B2 | 11/2002 | Hope | |
| 7,007,714 B2 | 3/2006 | Carroll | |
| 8,408,232 B2 | 4/2013 | Schisler | |
| 2010/0038576 A1* | 2/2010 | Hunnicutt | F16K 99/0001 251/318 |
| 2010/0090136 A1 | 4/2010 | Barriga et al. | |
| 2012/0285547 A1 | 11/2012 | Pucher | |
| 2013/0052359 A1 | 2/2013 | Ahmadi | |

FOREIGN PATENT DOCUMENTS

GB 2032062 4/1980

OTHER PUBLICATIONS

Swagelok, Pressure Regulator K Series, https://www.swagelok.com/downloads/webcatalogs/EN/MS-02-230.pdf, p. 3, Nov. 2013.

* cited by examiner

*Primary Examiner* — Kevin Murphy
*Assistant Examiner* — Paul J Gray
(74) *Attorney, Agent, or Firm* — John R. Casperson

(57) ABSTRACT

A fluid pressure regulator has a high pressure side and a low pressure side separated by a plunger. The plunger is biased against fluid pressure on the low pressure side. The fluid pressure on the low pressure side in opposition to the biasing means moves a primary passage through the plunger into and out of flow communication with fluid on the high pressure side under normal conditions. A fine passage through the plunger moves into and out of flow communication with fluid on the high pressure side under start-up conditions.

6 Claims, 2 Drawing Sheets

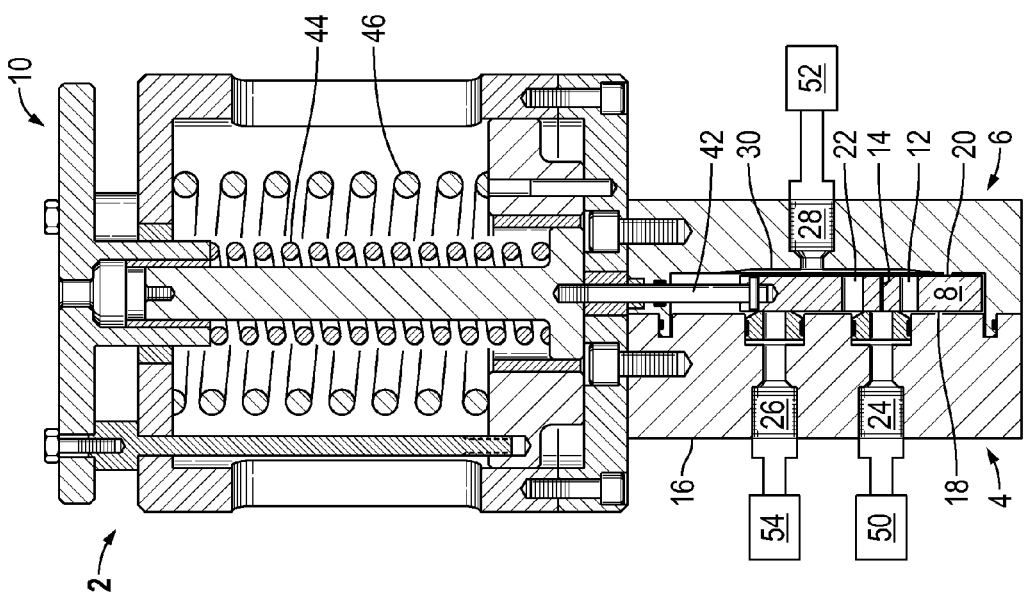
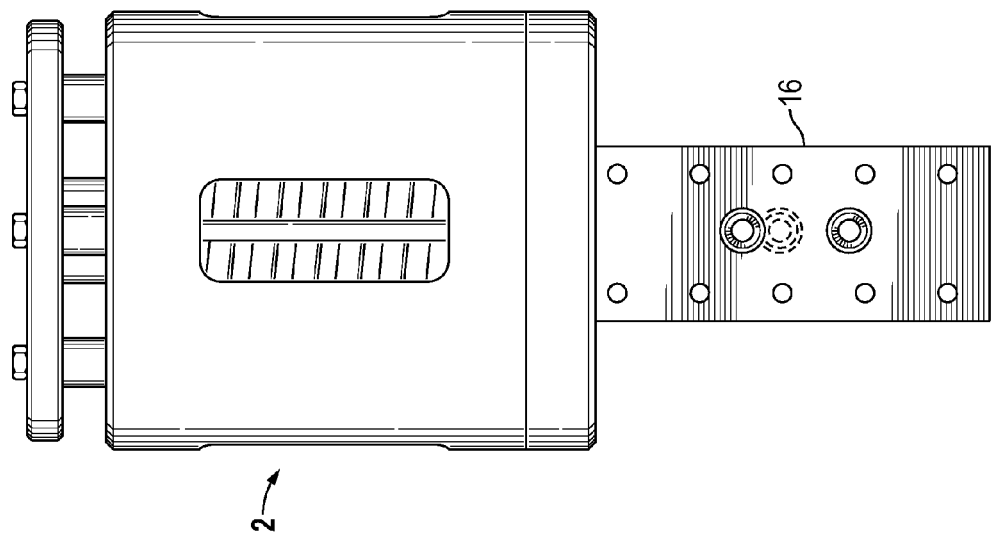

PRESSURE REGULATOR

FIELD OF THE INVENTION

One aspect of the invention relates to fluid pressure regulators. Another embodiment of the invention relates to a method for regulating fluid pressure.

BACKGROUND OF THE INVENTION

Fluid pressure regulators employing a plug body can chatter destructively in high pressure difference environments as the plug reciprocates between high flow and no flow positions, or high flow and vent conditions.

The problem is worse as the pressure difference increases. An example of where a solution is critically needed to the problem is offshore platform use in the oil and gas industry, as very high pressure regulated fluid flow is needed to operate safety and other critical equipment.

OBJECTS OF THE INVENTION

It is an object of this invention to provide a pressure regulator for reliably regulating fluid pressure.

It is another object of this invention to provide a pressure regulator not susceptible to self-induced destructive vibrations or chatter.

It is another object of this invention to provide a method for reliably supplying regulated high pressure fluid.

SUMMARY OF THE INVENTION

In one embodiment of the invention, there is provided a fluid pressure regulator having a high pressure side and a low pressure side separated by a plunger. The plunger is biased against fluid pressure on the low pressure side. The fluid pressure on the low pressure side in opposition to with the biasing means moves a primary passage through the plunger into and out of flow communication with fluid on the high pressure side under normal conditions. A fine passage through the plunger moves into and out of flow communication with fluid on the high pressure side under start-up or low-pressure demand conditions.

In another embodiment of the invention, there is provided a method for bringing a device fed from a high-pressure fluid source via a pressure regulator up to normal operating pressure range. The method is carried out by forming a fluid flow path between the high pressure fluid source and the fed device though fine cross-bore in a plunger. High pressure fluid is flowed through the fine cross-bore until pressure in the fed device approaches a predetermined normal operating pressure. The plunger then moves to cause high pressure fluid to flow through a primary cross-bore for operation of the fed device in the normal operating pressure range.

By bringing the fed device up to pressure slowly at start-up or under other conditions where the demand is at low pressure, destructive chatter can be avoided.

BRIEF DESCRIPTION OF THE DRAWINGS

FIG. 1 is a pictorial illustration of a pressure regulator according to one embodiment of the invention.

FIG. 2 is a side sectional view of the pressure regulator shown in FIG. 1.

DETAILED DESCRIPTION OF THE INVENTION

Figure 6:
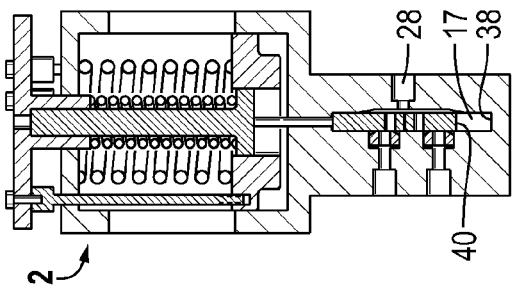
FIG. 6 is a side sectional view of the pressure regulator showing the passages in the regulator assigned to vent overpressure from the supplied device.
Figure 5:
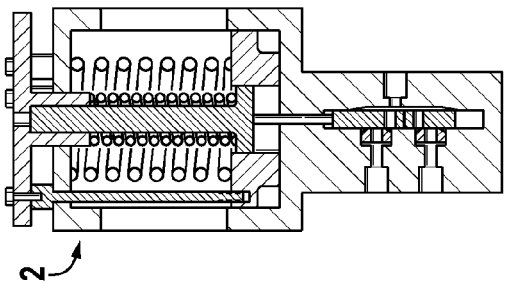
FIG. 5 is a side sectional view of the pressure regulator showing the passages in the regulator aligned to prevent flow through the regulator.

In one embodiment of the invention, there is provided a fluid pressure regulator 2 having a high pressure side 4 and a low pressure side 6 separated by a plunger 8. The plunger is biased against fluid pressure on the low pressure side. The fluid pressure on the low pressure side in conjunction with a biasing means 10 moves a primary passage 12 through the plunger into and out of flow communication with fluid on the high pressure side under normal conditions. A fine passage 14 through the plunger moves into and out of flow communication with fluid on the high pressure side under start-up conditions.

By fine is meant a passage of much smaller diameter than the primary passage. For example, the fine passage could have a diameter in the range of 5% to 25% of the main passage. On a numerical basis, a fine passage having a diameter in the range of 0.5 to 5 mm could be used for many applications.

By "fluid" is generally meant a hydraulic fluid, of which there are many types depending on application.

In a preferred embodiment, the plunger comprises a longitudinally elongated bar having a longitudinal axis, a first end and a second end. The bar is preferably rectilinear, and preferably has a rectangular cross section.

The low and high pressure sides of the regulator are halves of a housing 16. The housing defines a longitudinal passage 17 (see FIG. 6) having a longitudinal axis, and the longitudinal passage slidably receives the longitudinally elongated bar, so that the longitudinal axis of the passage coincides with the longitudinal axis of the bar.

The bar defines first, second and third bar cross-passages each extending transversely through the bar from a first face 18 to an opposite second face 20. The first transverse bar cross-passage 12 crosses between the first end and the second end of the bar. The second transverse bar cross-passage 22 crosses between the first transverse bar cross-passage and the second end of the bar. The third transverse bar cross-passage 14 crosses between the first transverse bar cross-passage and the second transverse bar cross-passage. The third transverse bar cross-passage is a fine passage, of a much smaller diameter than the first bar cross-passage or the second bar cross-passage. The first and third bar cross-passages each extend from an inlet on the first face of the bar to an outlet on the second face of the bar. The second bar cross-passage extends from an inlet on the second face of the bar to an outlet on the first face of the bar. The housing defines first, second and third housing lateral penetration passages 24, 26 and 28 respectively, each extending transversely from an outer surface of the housing to the longitudinal passage. The first and second housing lateral penetration passages are spaced apart longitudinally apart from each other. The first housing lateral penetration passage extends from an inlet on the first lateral side of the housing to an outlet at the longitudinal passage. The second lateral penetration passage extends from an inlet at the longitudinal passage to an outlet on the first lateral side of the housing. The third housing lateral penetration passage extends from a second lateral side of the housing opposite from the first lateral side of the housing to the longitudinal passage. The third housing lateral penetration passage intersecting the longitudinal passage at a longitudinal position across from a point between the first and second housing penetration passages.

At least one of the housing and the bar defines a longitudinal groove 30 to maintain the third housing lateral penetration passage in flow communication with all three of the cross passages though the bar. In the illustrated embodiment, the groove is formed in the housing.

The bar is positionable in first, second, third and fourth positions. See FIGS. 3, 4, 5 and 6 respectively.

When the bar is in the first position, the inlet to the third cross-passage is in peripherally sealed flow communication with the outlet of the first lateral penetration and the inlet to the second lateral penetration is sealed off by the first face of the bar. See FIG. 3. This is a start-up flow configuration.

When the bar is in the second position, the inlet to the first cross-passage through the bar is in peripherally sealed flow communication with the outlet of the first lateral penetration passage and the inlet to the second lateral penetration is sealed off by the first face of the bar. See FIG. 4. This is a normal flow configuration.

When the bar is in the third position, the outlet of the first lateral penetration passage and the inlet to of the second lateral penetration passage is sealed off by the first face of the bar. See FIG. 5. This is a no flow configuration.

When the bar is in the fourth position, the outlet to the first lateral penetration passage is sealed off by the first face of the bar and the inlet to the second lateral penetration is in peripherally sealed flow communication with the second cross-passage through the bar. See FIG. 6. This is a vent flow configuration.

Figure 7:
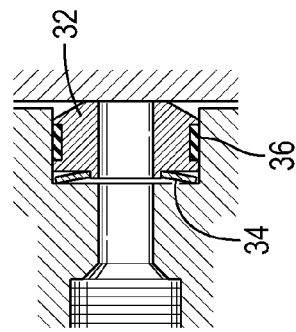
FIG. 7 is a detailed view of a portion the device shown in FIGS. 2-6.
Figure 4:
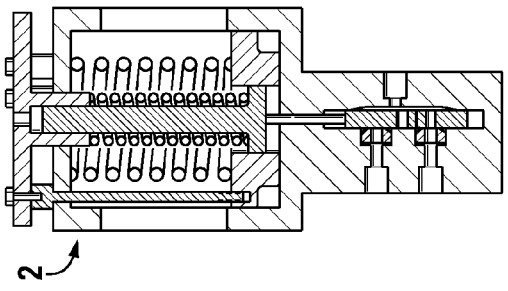
FIG. 4 is a side sectional view of the pressure regulator showing the passages in the regulator aligned to supply fluid according to demand.
Figure 3:
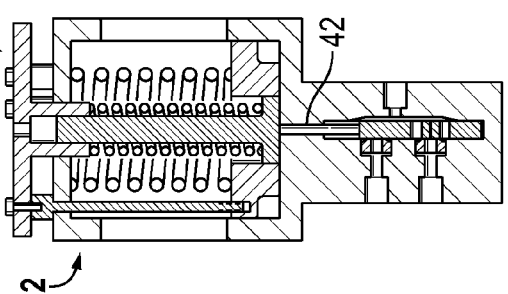
FIG. 3 is a side sectional view as in FIG. 2 at reduced scaled showing the passages in the regulator aligned for start-up.

FIG. 7 details, in cross section, a structure to provide sealing of the lateral penetration passages against the face of the bar. The lateral penetration is counterbored from its inside face for closely receiving a tubular insert 32 having a frustoconical end sealingly slidably contacting the face of the bar. Biasing means for example a Belleville spring 34 is positioned between the housing and an annular end of the insert and urges the insert against the face of the bar. An annular seal 36 is positioned in a circumferential groove around the insert to seal against the bored surface of the housing to prevent bypass of fluid around the insert.

The longitudinal passage in the housing has a first closed end 38 and a second end, and the first end 40 of the bar (See FIG. 6) is at the first end of the passage when the bar is in the first position. (See FIG. 3)

An actuator rod 42 extends from the second end of the bar and through the second end of the longitudinal passage, and the biasing means is 10 is connected to the actuator rod to urge the bar toward the first position. A seal is positioned around the rod to prevent leakage.

The biasing means includes a main spring 44 to bias the rod against movement from the first to the third positions and an auxiliary spring 46 for further biasing the rod against movement from the third to the fourth position. Means is provided for adjusting the compression on the springs. If the main spring is set to hold the plunger against, say, 3000 pounds of pressure, the auxiliary spring can be set to add, say 300 pounds, before the vent passage is opened.

Flow communication exists between the third housing lateral penetration passage 28 and the first end of the longitudinal passage in the housing via the clearance between the bar and the housing for slidably receiving the bar in the housing so that pressure at the penetration passage can act against the springs of the biasing means.

For use, a source 50 of high pressure fluid is in flow communication with the first housing lateral penetration passage and a device 52 which uses fluid at regulated pressure in flow communication with the third housing lateral penetration passage.

A vent passage 54 is provided to safely vent fluids in the event of overpressurization conditions in the device 52.

In another embodiment of the invention, there is provided a method for bringing a device fed from a high-pressure fluid source via a pressure regulator up to normal operating pressure range. The method is carried out by forming a fluid flow path between the high pressure fluid source and the fed device though fine cross-bore in a plunger. High pressure fluid is flowed through the fine cross-bore until pressure in the fed device approaches a predetermined normal operating pressure. The plunger then moves to cause high pressure fluid to flow through a primary cross-bore for operation of the fed device in the normal operating pressure range.

The method can be carried out using the above described pressure regulator. Where the pressure regulator employs a plunger having a first end and a second end, the first end being biased against a spring, said method preferably further comprises urging the plunger against the spring by fluid pressure on the second end of the plunger to overcome the spring and thereby move the plunger. The fluid urging against the second end of the plunger is preferably at or near the pressure of the fed device.

While certain preferred embodiments have been described herein, the invention is not to be construed as being so limited, except to the extent that such limitations are found in the claims.

What is claimed is:

1. Apparatus comprising
   a longitudinally elongated bar having a longitudinal axis, a first end and a second end,
   a housing defining a longitudinal passage having a longitudinal axis, said longitudinal passage slidably receiving the longitudinally elongated bar, so that the longitudinal axis of the passage coincides with the longitudinal axis of the bar,
   wherein the bar defines first, second and third bar cross-passages each extending transversely through the bar from a first face to an opposite second face, the first transverse bar cross-passage crossing between the first end and the second end of the bar, the second transverse bar cross-passage crossing between the first transverse bar cross-passage and the second end, and the third transverse bar cross-passage crossing between the first transverse bar cross-passage and the second transverse bar cross-passage, said third transverse bar cross-passage being of a much smaller diameter than the first bar cross-passage or the second bar cross-passage, said first and third bar cross-passages extending from an inlet on the first face of the bar to an outlet on the second face of the bar, said second bar cross-passage extending from an inlet on the second face of the bar to an outlet on the first face of the bar,
   wherein the housing defines first, second and third housing lateral penetration passages each extending transversely from an outer surface of the housing to the longitudinal passage, said first and second housing lateral penetration passages being spaced apart longitudinally apart from each other, said first housing lateral penetration passage extending from an inlet on the first lateral side of the housing to an outlet at the longitudinal passage, said second lateral penetration passage extending from an inlet at the longitudinal passage to an outlet on the first lateral side of the housing, and said third housing lateral penetration passage extending from a second lateral side of the housing opposite from the first lateral side of the housing to the longitudinal passage, said third housing lateral penetration passage intersecting the longitudinal passage at a longitudinal position across from a point between the first and second housing penetration passages, wherein at least one of the housing and the bar defines a longitudinal groove to maintain the third housing lateral penetration passage in flow communication with all three of the cross passages though the bar, wherein the bar is positionable in first, second, third and fourth positions, wherein when the bar is in the first position, the inlet to the third cross-passage is in peripherally sealed flow communication with the outlet of the first lateral penetration and the inlet to the second lateral penetration is sealed off by the first face of the bar, wherein when the bar is in the second position, the inlet to the first cross-passage through the bar is in peripherally sealed flow communication with the outlet of the first lateral penetration passage and the inlet to the second lateral penetration is sealed off by the first face of the bar, wherein when the bar is in the third position, the outlet of the first lateral penetration passage and the inlet to the second lateral penetration passage is sealed off by the first face of the bar; and wherein when the bar is in the fourth position, the outlet to the first lateral penetration passage is sealed off by the first face of the bar and the inlet to the second lateral penetration is in peripherally sealed flow communication with the second cross-passage through the bar.

2. Apparatus as claim 1 wherein
the longitudinal passage in the housing has a first closed end and a second end, and the first end of the bar is at the first end of the passage when the bar is in the first position.

3. Apparatus as in claim 1 wherein
the longitudinal passage in the housing has a first closed end and a second end, said apparatus further comprising an actuator rod extending from the second end of the bar and through the second end of the longitudinal passage, and
a biasing means connected to the actuator rod to urge the bar toward the first position.

4. Apparatus as in claim 3 wherein the biasing means includes a main spring to bias the rod against movement from the first to the third positions and an auxiliary spring for further biasing the rod against movement from the third to the fourth position.

5. Apparatus as in claim 2 wherein flow communication exists between the third housing lateral penetration passage and the second end of the longitudinal passage in the housing.

6. Apparatus as in claim 5 further comprising a source of high pressure fluid in flow communication with the first housing lateral penetration passage and a device which uses fluid at regulated pressure in flow communication with the third housing lateral penetration passage.

\* \* \* \* \*